United States Patent [19]

Tak et al.

[11] 3,718,600

[45] Feb. 27, 1973

[54] METHOD OF MANUFACTURING A LUMINESCENT SILICATE ACTIVATED BY BIVALENT EUROPIUM

[75] Inventors: Marinus Gerardus Antoine Tak; Otto Jan Van Klinken, both of Emmasingel, Eindhoven, Netherlands

[73] Assignee: U.S. Philips Corporation, New York, N.Y.

[22] Filed: June 23, 1971

[21] Appl. No.: 155,840

[30] Foreign Application Priority Data

July 1, 1970 Netherlands ..................7009688

[52] U.S. Cl............................................252/301.4 F
[51] Int. Cl. ..........................C09k 1/54, C09k 1/62
[58] Field of Search ................................252/301.4 F

[56] References Cited

UNITED STATES PATENTS 2,171,145  8/1939  Leverenz.......................252/301.4 F
2,297,108  9/1942  McKeag et al. ...............252/301.4 F

FOREIGN PATENTS OR APPLICATIONS 1,915,360  10/1969  Germany......................252/301.4 F

*Primary Examiner*—Robert D. Edmonds
*Attorney*—Frank R. Trifari

[57] ABSTRACT

A luminescent silicate activated by bivalent europium defined by the formula $Ba_{1-x-p}Sr_xEu_pZrSi_3O_9$ which $0 \leq x \leq 0.2$ and $0.002 \leq p \leq 0.10$ is prepared by starting from a mixture of barium strontium disilicate, at least 1.5 mol of $ZrO_2$ and at least 1 mol of $SiO_2$ per mol of disilicate. The mixture, which also comprises europium, is heated at a temperature of between 1,200° and 1,400°C is a reducing atmosphere.

7 Claims, 1 Drawing Figure

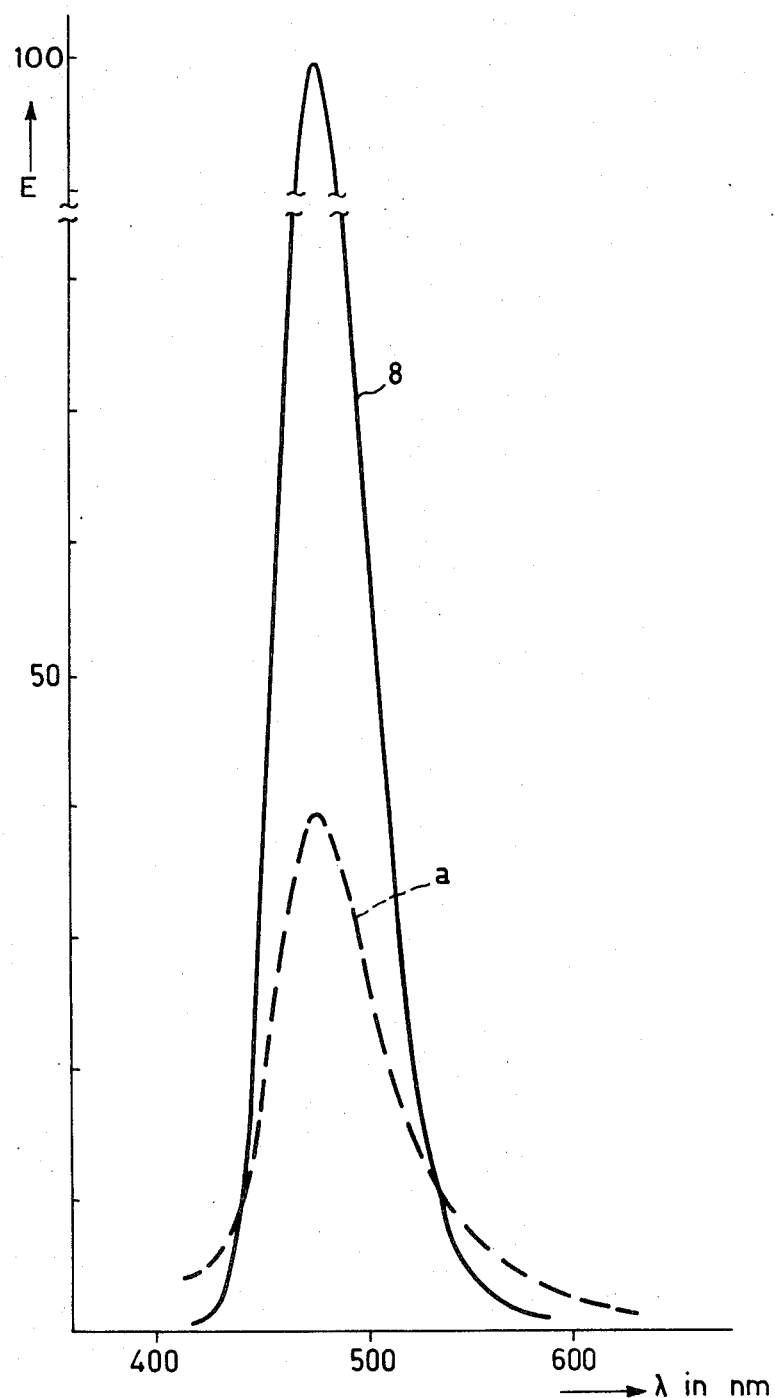

METHOD OF MANUFACTURING A LUMINESCENT SILICATE ACTIVATED BY BIVALENT EUROPIUM

This invention relates to a method of manufacturing a luminescent silicate activated by bivalent europium which is defined by the formula $Ba_{1-x-p} Sr_x Eu_p ZrSi_3O_9$ in which $0 \leq x \leq 0.2$ and $0.002 \leq p \leq 0.10$. Furthermore the invention relates to a luminescent silicate manufactured by such a method.

The luminescent barium zirconium silicates in which a portion of barium may be replaced by strontium and which may be defined by the above-mentioned formula have been described in the Netherlands Pat. application No. 6,916,882. These silicates can be satisfactorily excited both by short-wave and by long-wave ultraviolet radiation and even by blue visible radiation. Also when excited by electrons they have a satisfactory light output. The emitted radiation of these silicates consists of a narrow band having a maximum at approximately 475 nm. As a result of the high light output and the favorable location of the emission in the spectrum these silicates are particularly suitable for use in low-pressure and high-pressure mercury vapor discharge lamps.

The above-noted Netherlands Patent application describes a method of manufacturing these silicates while starting from a mixture of barium carbonate (and optionally strontium carbonate), europium oxide, zirconium oxide and silicon oxide. A portion of barium and/or strontium may furthermore be added as a fluoride. These starting materials are used in quantities corresponding to the quantities required in accordance with the stoichiometry except for a small excess of $SiO_2$. The mixture is heated at a high temperature in a reducing atmosphere and the desired silicate is formed. When using this method, also in case of comparatively long firing periods, not only the desired luminescent silicate phase but also compounds are obtained which exert a detrimental influence on the light output and often also on the spectral distribution of the emitted radiation of the desired luminescent silicate. This method has furthermore the drawback that a densely sintered produce is obtained so that long periods of grinding operations are required for practical uses. This dense sintering also occurs when the firing mixture is first prefired at comparatively low temperatures and is subsequently after-fired at a comparatively high temperature. It has been found that in connection with the occurrence of the dense sintering of the final product in the method only firing temperatures can be employed at which the full conversion of the starting materials into the desired silicate phase is impossible. A full reaction is possible at very high reaction temperature (for example, to 1,450°C). The barium zirconium silicate formed is then, however, very densely sintered and has often even melted so that it is not suitable at all for practical uses.

The object of the present invention is to provide an improved method of manufacturing the luminescent silicates mentioned in the preamble in which the drawbacks of the method already described are largely obviated.

According to the invention a method of manufacturing a luminescent silicate activated by bivalent europium defined by the formula $BA_{1-x-p} Sr_x Eu_p ZrSi_3O_9$ in which $0 \leq x \leq 0.2$ and $0.002 \leq p \leq 0.10$ is characterized in that barium strontium disilicate is mixed with at least 1.5 mol of $ZrO_2$ per mol of disilicate and at least 1 mol of $SiO_2$ per mol of disilicate, europium being added in the desired quantity to the mixture, and that the mixture is subsequently heated at a temperature of between 1,200° and 1,400°C in a reducing atmosphere.

In a method according to the invention barium strontium disilicate is used as a starting material. In this respect the term "barium strontium disilicate" is to be understood to mean barium disilicate in which barium may be partly replaced by strontium, namely for as large a part as is desired in the final product. Furthermore, this term comprises a mixture of barium disilicate and strontium disilicate in the desired molar ratio. Finally it is possible that barium strontium disilicate comprises the quantity of europium or a part thereof desired in the final product. Further starting materials in a method according to the invention are $ZrO_2$ and $SiO_2$ or compounds which produce these oxides upon heating. Europium may be used as $Eu_2O_3$, but it is alternatively possible to use a compound which produces europium oxide upon heating or, as already described above, to start from a europium-containing barium strontium disilicate.

$SiO_2$ is to be present in a quantity which is at least equal to the stoichiometrically required quantity (1 mol per mol of disilicate). On the other hand $ZrO_2$ is to be used in an excess amount in a method according to the invention, namely at least 1.5 mol per mol of disilicate (according to stoichiometry, only 1 mol per mol of disilicate is required).

In a method according to the invention it is found to be possible to use comparatively high firing temperatures (up to 1,400°C) at temperatures a final product is formed which is only slightly sintered. By starting from barium strontium disilicate a full reaction of the firing mixture in the desired luminescent silicate phase may be achieved with no dense sintering occurring. The absence of other luminescent silicate phases is found from the spectral distribution of the emission of the reaction product upon excitation by ultraviolet radiation. It has suprisingly been found that when using an excess of $ZrO_2$ in the firing mixture luminescent silicates are obtained whose light outputs are considerably higher than those of the silicates obtained from a firing mixture containing the stoiciometric quantity of $ZrO_2$. The excess of $ZrO_2$ remains in the final product and causes no disturbing effects.

In addition to the advantages of the reduced amount of sintering and of the high light output of the silicate obtained, a method according to the invention has the important advantage that upon excitation by ultraviolet radiation the silicate obtained is found to have a spectral distribution of the emitted radiation which is narrower than that of the silicate manufactured in the known method. For uses in low-pressure mercury vapor discharge lamps this is a desired property in many cases. This narrower spectral distribution may be explained by the fact that other luminescent silicate phases are absent such as, for example, the known barium disilicate activated by bivalent europium.

The highest light outputs are obtained with silicates manufactured by a method according to the invention in which the firing mixture contains between 1.75 and 3.0 mol of $ZrO_2$ per mol of disilicate. These quantities of $ZrO_2$ are therefore preferred.

In a further preferred embodiment of a method according to the invention $SiO_2$ is also used in excess, namely 1.5 to 2.5 mol of $SiO_2$ per mol of disilicate is added. A reaction product is then obtained which is very much desired for the processing of the reaction product. The use of an excess of $SiO_2$ substantially does not exert any influence on the luminescence properties of the final product.

The time during which the heat treatment is to take place for a method according to the invention may be chosen to be within very wide limits. This heating time is dependent on the chosen firing temperature, the reactivity of the starting mixture and the quantity of the starting mixture. In general firing times of between 2 and 8 hours are preferred at firing temperatures of between 1,300° and 1,400°C. It is often advantageous to carry out the heat treatment in steps, for example, 2 or more times for 2 to 4 hours at a temperature of between 1,300° and 1,400°C. After each heat treatment the product obtained is ground and sieved if necessary.

The barium strontium disilicate to be used in a method according to the invention may be previously prepared in known manner by heating a starting mixture of BaO, SrO or $SiO_2$ or of compounds which produce these oxides upon heating. In a preferred embodiment of a method according to the invention the disilicate is previously prepared by heating such a mixture which contains at least 3 mol of $SiO_2$ per mol of barium oxide and strontium oxide, so that the disilicate formed is already mixed with the quantity of $SiO_2$ required for obtaining the desired luminescent silicate. In this manner an even slighter sintering of the final product is obtained so that the luminescent silicate can be processed even better.

As already noted above, the barium strontium disilicate to be used as a starting material in a method according to the invention may contain the required quantity of europium. Europium is then built into the disilicate lattice and there it replaces the barium or strontium ions. Such a starting material is often preferred because, as compared with a method in which europium is added as $Eu_2O_3$, a higher light output of the final product is obtained. Depending on the firing atmosphere during the manufacture of europium-containing disilicate, europium is present in a bivalent or trivalent state. If the disilicate contains trivalent europium it is reduced to bivalent europium during the formation of the desired luminescent silicate by means of heating in a reducing atmosphere.

In order that the invention may be readily carried into effect, it will now be described in detail with reference to several Examples, a Table and a drawing.

In the drawing a graph shows the spectral energy distribution of a barium zirconium silicate according to the invention.

TABLE

| Example | Firing mixture in moles | | | Light output in %[1] |
|---|---|---|---|---|
| | alkaline earth disilicate | $ZrO_2$ | $SiO_2$ | |
| a | (2) | — | — | 28.5 |
| b | (0.98BaO) (2.1$SiO_2$) (0.01$Eu_2O_3$) | 1 | 1 | 16.0 |
| | " | 1 ⅓ | 1 | 25.5 |
| | " | 1 ⅔ | 1 | 49.5 |
| | " | 1 ⅔ | 1 ⅓ | 43.5 |
| | " | 1 ⅔ | 1 ⅔ | 47.0 |
| 4 | " | 1 ⅔ | 2 | 46.5 |
| 5 | " | 2 | 1 | 45.5 |
| 6 | " | 2 | 1 ½ | 43.5 |
| 7 | " | 2 | 1 ⅔ | 43.5 |
| 8 | " | 2 | 2 | 45.0 |
| 9 | (0.78BaO) (0.20SrO) (2.1$SiO_2$) (0.01$Eu_2O_3$) | 2 | 2 | 48.0 |
| 10 | (0.98BaO) (2.1$SiO_2$) (0.02EuO) | 2 | 1 | 51.5 |
| 11 | " | 2 ½ | 1 | 46.5 |
| 12 | " | 3 | 1 | 43.0 |
| 13 | (3) " | 2 | 1 | 53.0 |
| 14 | (4) " | 2 | 1 | 55.0 |
| 15 | (0.95BaO) (3.1$SiO_2$) 0.05EuO) | 2 | — | 60.5 |

1. measured relative to the light output of phosphor having the molar composition (0.78 BaO) (0.20 SrO) (2.1 $SiO_2$) (0.20 EuO) upon excitation by ultraviolet radiation (254 nm).
2. firing mixture and manufacture in accordance with the Netherlands Pat. application No. 6,916,882.
3. in addition to these materials the firing mixture also contains 0.0025 mol of $Eu_2O_3$.
4. in addition to these materials the firing mixture also contains 0.005 mol of $Eu_2O_3$.

EXAMPLE 1

For the manufacture of a barium zirconium silicate activated by bivalent europium according to the invention, an alkaline earth disilicate was used as a starting material which comprises europium in a trivalent form and which is defined by the formula (0.98BaO) (2.1 $SiO_2$) (0.01 $Eu_2O_3$) manufactured by heating a mixture of barium carbonate, silicon dioxide an europium oxide ($Eu_2O_3$) for 3 hours at 1,000°C in air.

The disilicate thus obtained was mixed with 1⅔mol $ZrO_2$ and 1 mol $SiO_2$ per mol of disilicate and subsequently heated in a covered crucible for 4 hours at a temperature of 1,350°C. To obtain a reducing firing atmosphere the heat treatment was performed in the presence of a quantity of carbon or graphite in the vicinity of the crucible. The oxygen from the ambiance was bound by the carbon so that a reducing atmosphere comprising carbon monoxide was formed. After the heat treatment, the crucible with contents was allowed to cool off, while nitrogen was passed into the cooling space (approximately 10 l or $N_2$ per minute). The firing product was pulverized, ground and sieved, if necessary, thereafter it was again subjected to a heat treatment under the same circumstances as those described above, namely for 4 hours at a temperature of 1,350°C in a reducing atmosphere.

The final product obtained satisfied the formula $Ba_{0.98}$ $Eu_{0.02}$ $ZrSi_3O_9$ and furthermore it contained the used excess of $ZrO_2$. Upon excitation by ultraviolet radiation having a wavelength of 254 nm the light output of the barium zirconium silicate thus prepared was 49.5 percent of the light output of a barium strontium disilicate activated by bivalent europium and emitting in the same part of the spectrum.

EXAMPLES 2 TO 8

In the same manner as in Example 1, luminescent silicates defined by the formula $Ba_{0.98}$ $Eu_{0.02}$ $ZrSi_3O_9$ were manufactured in which, however, different quantities of $ZrO_2$ and $SiO_2$ were used. The above-mentioned Table shows for each of the Examples 2 to 8 the quantities of $ZrO_2$ and $SiO_2$ used per mol of alkaline earth disilicate. The last column of the Table shows for each Example the light output upon excitation by ultraviolet radiation having a wavelength of 254 nm. The light output is given in percent relative to the luminescent disilicate mentioned in Example 1, which is used as a standard.

For the purpose of comparison the Table includes the Examples *b* and *c* (not according to the invention). The manufacture of the luminescent silicates according to Examples *b* and *c* is effected in a manner which is completely analogous to the manner as described in Example 1. However, in Example *b* the stoichiometrically required quantities of $ZrO_2$ and $SiO_2$ have been used and in Example *c* only a slight excess of $ZrO_2$ has been used. It is quite obvious that with a method according to the invention luminescent silicates are obtained which have a considerable higher light output than the silicates manufactured in accordance with Example *b* or *c*.

Likewise for the purpose of comparison a barium zirconium silicate has been shown as Example *a* which is manufactured in accordance with the method described in the Netherlands Pat. application No. 6,916,882 which method starts from a mixture of 0.93 mol $BaCO_3$, 0.05 mol $BaF_2$, 1.0 mol $ZrO_2$, 3.3 mol $SiO_2$ and 0.01 mol $Eu_2O_3$. This mixture was heated for 4 hours at a temperature of 1,250°C in a reducing atmosphere consisting of nitrogen and 5 percent by volume of hydrogen. After cooling, grinding and sieving the reaction product was again heated in a reducing atmosphere for 2 hours at 1,350°C. The final product is relatively densely sintered and has a light output of only 28.5 percent.

EXAMPLE 9

Entirely analogous to Example 8, a luminescent silicate defined by the formula $Ba_{0.78}Sr_{0.20}Eu_{0.02}ZrSi_3O_9$ was manufactured. The alkaline earth disilicate to be used as a starting material satisfies the formula (0.78 BaO) (0.20 Sro) (2.1 $SiO_2$) (0.02 $Eu_2O_3$) and has been obtained in a manner as described in Example 1 in which, however, the mixture contained not only barium carbonate but also strontium carbonate. As in Example 8, the disilicate was mixed with 2 mol $ZrO_2$ and 2 mol $SiO_2$ per mol of disilicate.

EXAMPLES 10 TO 12

The manufacture was effected in the same way as described in Example 1, on the understanding that the alkaline earth disilicate to be used as a starting material was manufactured by heating a mixture of barium carbonate, silicon dioxide and europium oxide ($Eu_2O_3$) for 3 hours at a temperature of 1,000°C in a reducing atmosphere. The disilicate comprises europium in a bivalent form and satisfies the formula (0.98 BaO) (2.1 $SiO_2$) (0.02 EuO) $ZrO_2$ quantities of 2, 2½ and 3 mol, respectively, per mol of disilicate were used.

EXAMPLES 13 AND 14.

In the same manner as described with reference to Example 10, a luminescent barium zirconium silicate according to the invention was manufactured in which, however, also 0.0025 mol $Eu_2O_3$ (Example 13) and 0.005 mol $Eu_2O_3$ (Example 14) were added to the firing mixture. The luminescent silicates obtained satisfy the formulas $Ba_{0.975}Eu_{0.025}ZrSi_3O_9$ and $Ba_{0.97}Eu_{0.03}ZrSi_3O_9$, respectively.

EXAMPLE 15

By heating a mixture of barium carbonate, europium oxide and an excess of silicon dioxide at 1,200°C in a reducing atmosphere an alkaline earth disilicate was obtained which was already mixed with the quantity of silicon dioxide required for the formation of barium zirconium silicate according to the invention. The resultant silicate, which may be defined by the formula (0.95 BaO) (3,1$SiO_2$) (0.05EuO), was mixed with 2 mol zirconium oxide per mol of disilicate and was subsequently heated twice in a furnace for 4 hours at a temperature of 1,350°C in a reducing atmosphere. The barium zirconium silicate obtained satisfies the formula $Ba_{0.95}Eu_{0.05}ZrSi_3O_9$ and has a light output of 60.5 percent upon excitation by ultraviolet radiation.

The Table shows a survey of the composition of the firing mixture and of the light output for each Example measured upon excitation by ultraviolet radiation (254 nm).

The Figure shows in a graph the spectral energy distribution of the emitted radiation of barium zirconium silicate manufactured in accordance with Example 8 upon excitation by ultraviolet radiation having a wavelength of 254 nm (curve 8). The wavelength λ in nm is plotted on the horizontal axis and the energy E of the emitted radiation is plotted in arbitrary units on the vertical axis. For the purpose of comparison the broken-line curve *a* is included which shows the spectral energy distribution of barium zirconium silicate manufactured in known manner according to Example *a*. It is clearly shown that barium zirconium silicate manufactured according to the invention has a higher light output and a considerably higher peak height than the silicate manufactured in the known manner. Furthermore, it is found that the half value width of the silicate manufactured in accordance with the invention is smaller, (approximately 50 nm) than that of the silicate manufactured in known manner (approximately 60 nm).

What is claimed is:

1. A method of manufacturing a luminescent silicate activated by bivalent europium defined by the formula $Ba_{1-x-p}Sr_xEw_pZNSi_3O_9$ in which $0 \leq x \leq 0.2$ and $0.002 \leq p \leq 0.10$, comprising mixing barium strontium disilicate with at least 1.5 mol of $ZrO_2$ per mol of disilicate and at least 1 mol of $SiO_2$ per mol of disilicate, adding europium in the desired quantity to the mixture and heating the mixture at a temperature of between 1,200° and 1,400°C in a reducing atmosphere.

2. A method of claim 1, wherein the mixture comprises between 1.75 and 3.0 mol of $ZrO_2$ per mol of disilicate.

3. A method of claim 2, wherein the mixture comprises between 1.5 and 2.5 mol of $SiO_2$ per mol of disilicate.

4. A method of claim 3 wherein the mixture is heated for 2 to 8 hours at a temperature of between 1,300° and 1,400°C.

5. A method of claim 3, in which the barium strontium disilicate to be used is manufactured by heating a starting mixture of barium oxide, strontium oxide and silicon oxide, or of compounds which produce these oxides upon heating, wherein the starting mixture comprises at least 3 mol of $SiO_2$ per mol of barium oxide and strontium oxide so that the barium strontium disilicate formed is already mixed with quantity of $SiO_2$ required for obtaining the desired luminescent silicate.

6. A method of claim 3 wherein the barium strontium disilicate to be used comprises the desired quantity of europium.

7. A luminescent silicate activated by bivalent europium and defined by the formula $Ba_{1-x-p}Sr_xEu_pZrSi_3O_9$ in which $0 \leq x \leq 0.2$ and $0.002 \leq p \leq 0.10$, and manufactured by a method of claim 1.

* * * * *

UNITED STATES PATENT OFFICE
CERTIFICATE OF CORRECTION

Patent No. 3,718,600 (PHN 4956)    Dated February 27, 1973

Inventor(s) MARINUS GERARDUS ANTOINE TAK ET AL

It is certified that error appears in the above-identified patent and that said Letters Patent are hereby corrected as shown below:

In the title page, last line of the Abstract, "is" should read -- in --;

Column 6, line 52, "$Ew_pZN$" should read -- $Eu_pZr$ --.

Signed and sealed this 10th day of July 1973.

(SEAL)
Attest:

EDWARD M. FLETCHER, JR.
Attesting Officer

Rene Tegtmeyer
Acting Commissioner of Patents